(12) United States Patent
Katayose

(10) Patent No.: US 12,436,372 B2
(45) Date of Patent: Oct. 7, 2025

(54) ZOOM LENS, IMAGE PICKUP APPARATUS, AND IMAGING SYSTEM

(71) Applicant: CANON KABUSHIKI KAISHA, Tokyo (JP)

(72) Inventor: Masato Katayose, Tochigi (JP)

(73) Assignee: CANON KABUSHIKI KAISHA, Tokyo (JP)

(*) Notice: Subject to any disclaimer, the term of this patent is extended or adjusted under 35 U.S.C. 154(b) by 369 days.

(21) Appl. No.: 18/063,122

(22) Filed: Dec. 8, 2022

(65) Prior Publication Data

US 2023/0213744 A1     Jul. 6, 2023

(30) Foreign Application Priority Data

Jan. 1, 2022 (JP) ................................. 2022-000015

(51) Int. Cl.
G02B 15/20     (2006.01)
(52) U.S. Cl.
CPC ................. G02B 15/20 (2013.01)
(58) Field of Classification Search
CPC ............ G02B 15/20; G02B 15/145129; G02B 15/1461; G02B 15/177; G02B 15/1451
See application file for complete search history.

(56) References Cited

U.S. PATENT DOCUMENTS

| 10,838,201 | B2 | 11/2020 | Katayose |
| 10,921,569 | B2 | 2/2021 | Katayose |
| 11,002,944 | B2 | 5/2021 | Katayose |
| 11,243,385 | B2 | 2/2022 | Katayose et al. |
| 11,249,291 | B2 | 2/2022 | Katayose |
| 2008/0285150 | A1* | 11/2008 | Souma ........... G02B 15/143105 359/683 |
| 2021/0132346 | A1* | 5/2021 | Kitada ............... G02B 27/0025 |
| 2021/0396977 | A1* | 12/2021 | Tanaka ............... G02B 15/1461 |
| 2023/0030784 | A1 | 2/2023 | Katayose |

FOREIGN PATENT DOCUMENTS

| JP | H09-325274 A | 12/1997 |
| JP | 2020-086073 A | 6/2020 |

* cited by examiner

*Primary Examiner* — Thomas K Pham
*Assistant Examiner* — Justin W. Hustoft
(74) *Attorney, Agent, or Firm* — Carter, DeLuca & Farrell LLP

(57) ABSTRACT

A zoom lens includes, in order from an object side to an image side, a first lens unit having positive refractive power, a second lens unit having negative refractive power, and a subsequent unit including a plurality of lens units. A distance between adjacent lens units changes during zooming. The first lens unit does not move and the second lens unit moves during zooming. The first lens unit consists of, in order from the object side to the image side, a first subunit and a second subunit. The first subunit consists of two positive lenses. The second subunit consists of a single positive lens and a single negative lens. A predetermined condition is satisfied.

17 Claims, 9 Drawing Sheets

ZOOM LENS, IMAGE PICKUP APPARATUS, AND IMAGING SYSTEM

BACKGROUND

Technical Field

One of the aspects of the disclosure relates to a zoom lens, which is suitable for a digital video camera, a digital still camera, a broadcast camera, a film-based camera, a surveillance camera, and the like.

Description of the Related Art

Zoom lenses for image pickup apparatuses have recently been demanded for high optical performance over the entire zoom range and reduced weight. In order to meet these requirements, there is proposed a zoom lens includes, in order from the object side to the image side, a first lens unit having positive refractive power, a second lens unit having negative refractive power, and a subsequent unit including a plurality of lens units (see Japanese Patent Laid-Open Nos. 9-325274 and 2020-86073).

A large-aperture telephoto zoom lens having a long focal length and a small F-number tends to have a large lens diameter and heavy weight. In order to realize the reduced weight of the zoom lens, it is effective to strengthen the positive refractive power of the first lens unit and to reduce lens diameters of lens units included in the subsequent unit. However, if the refractive power of the first lens unit is made too strong, it becomes difficult to correct spherical aberration, longitudinal chromatic aberration, and lateral chromatic aberration, especially at a telephoto end.

SUMMARY

One of the aspects of the disclosure provides a lightweight zoom lens having high optical performance over the entire zoom range, an image pickup apparatus, and an imaging system each having the zoom lens.

A zoom lens according to one aspect of the disclosure includes, in order from an object side to an image side, a first lens unit having positive refractive power, a second lens unit having negative refractive power, and a subsequent unit including a plurality of lens units. A distance between adjacent lens units changes during zooming. The first lens unit does not move and the second lens unit moves during zooming. The first lens unit consists of, in order from the object side to the image side, a first subunit and a second subunit. The first subunit consists of two positive lenses. The second subunit consists of a single positive lens and a single negative lens. The following inequalities are satisfied:

$$-0.45 < f1a/f1b < -0.10$$

$$-5.50 < f1/f2 < -3.00$$

where f1a is a focal length of the first subunit, f1b is a focal length of the second subunit, f1 is a focal length of the first lens unit, and f2 is a focal length of the second lens unit. An image pickup apparatus and an imaging system each having the above zoom lens also constitute another aspect of the disclosure.

Further features of the disclosure will become apparent from the following description of exemplary embodiments with reference to the attached drawings.

DESCRIPTION OF THE EMBODIMENTS

Figure 1:
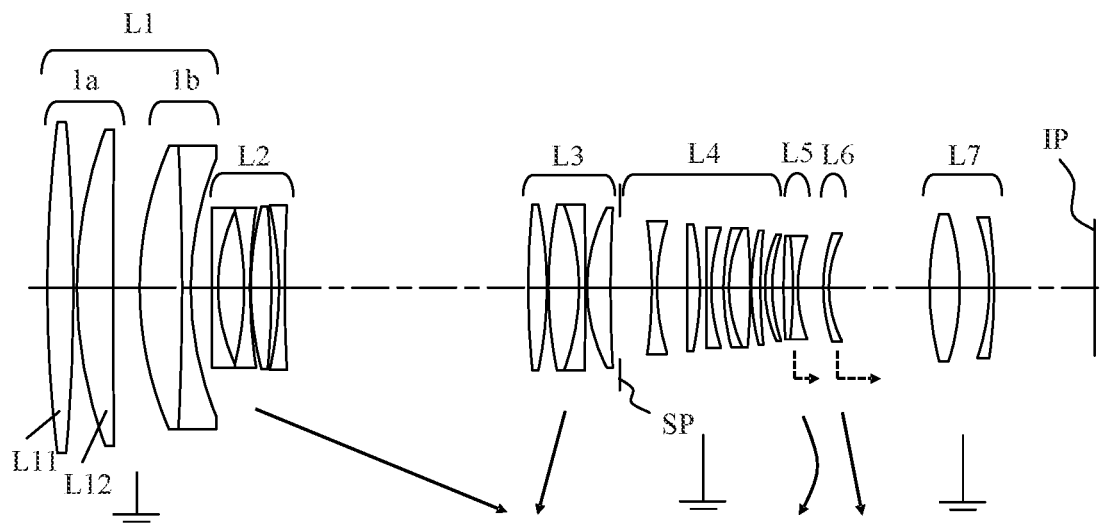
FIG. 1 is a sectional view of a zoom lens according to Example 1 at a wide-angle end.
Figure 2A:
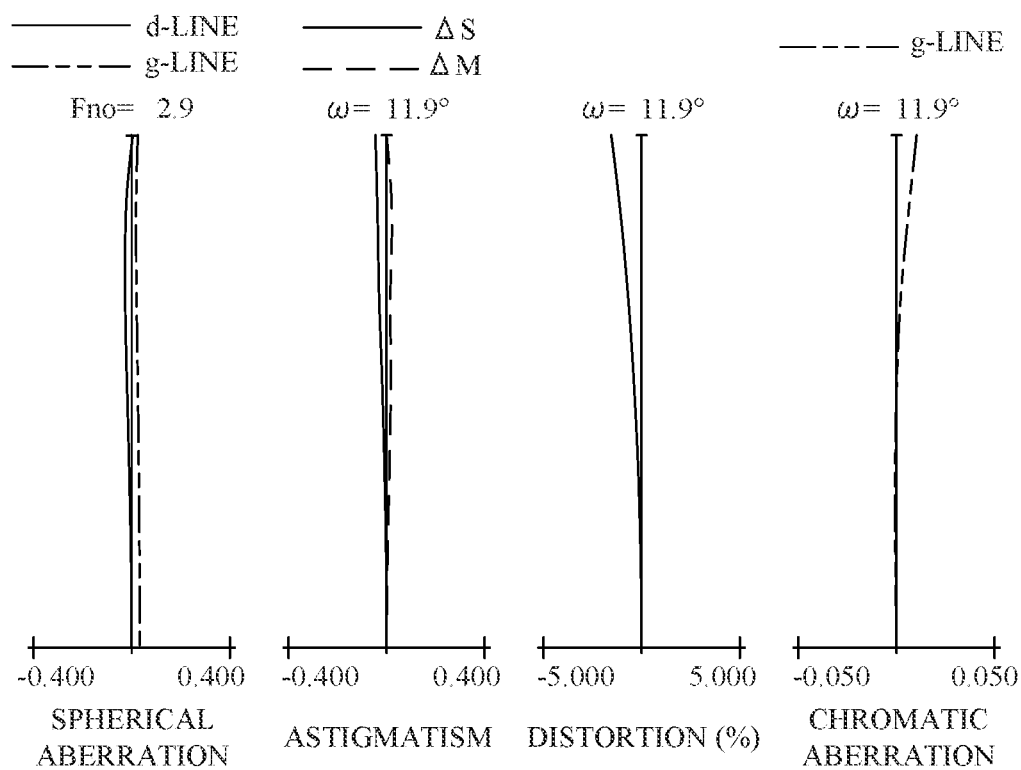
FIGS. 2A to 2C are aberration diagrams of the zoom lens according to Example 1 at the wide-angle end, a middle (intermediate) zoom position, and a telephoto end, respectively.
Figure 2B:
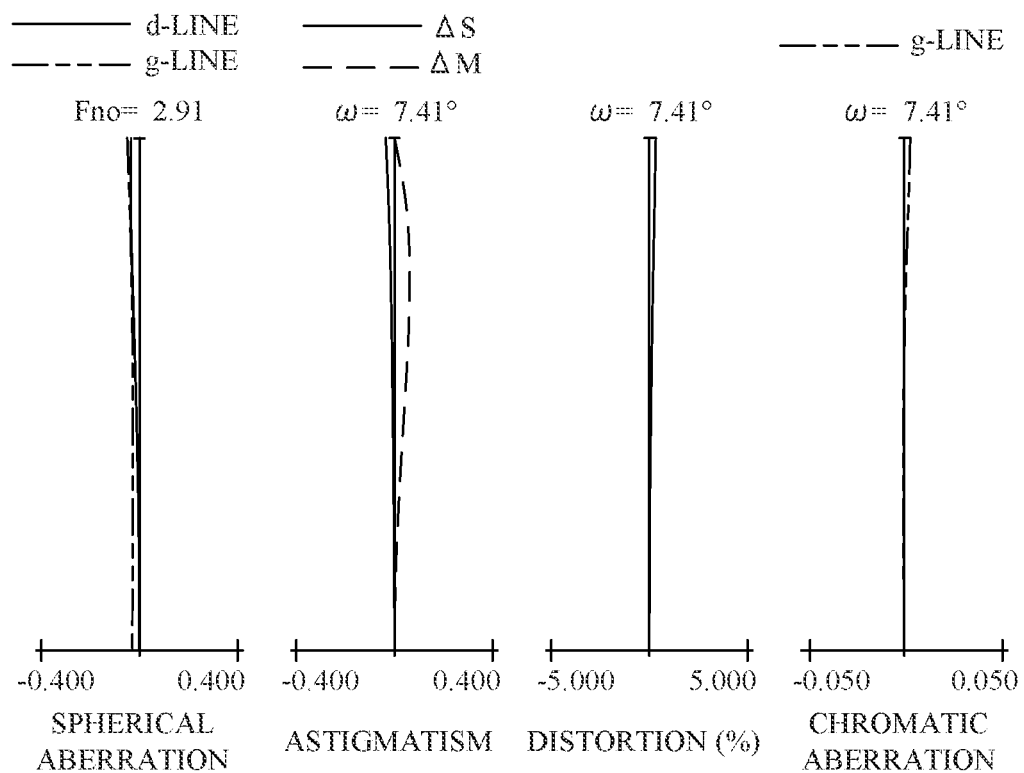
Figure 2C:
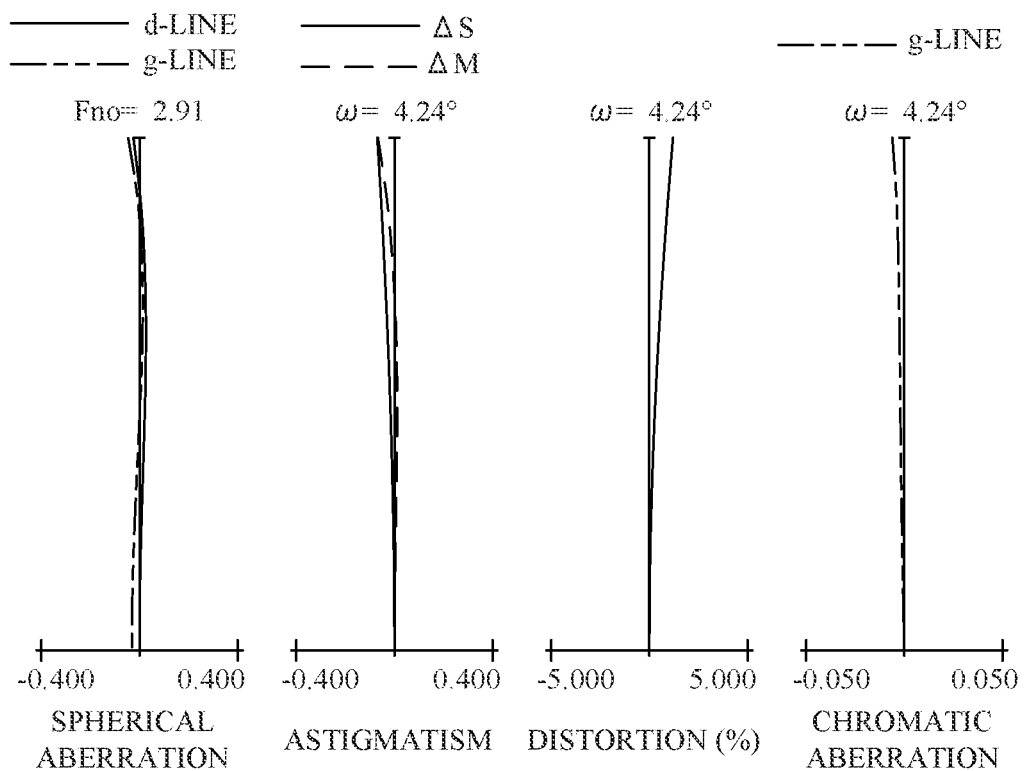
Figure 3:
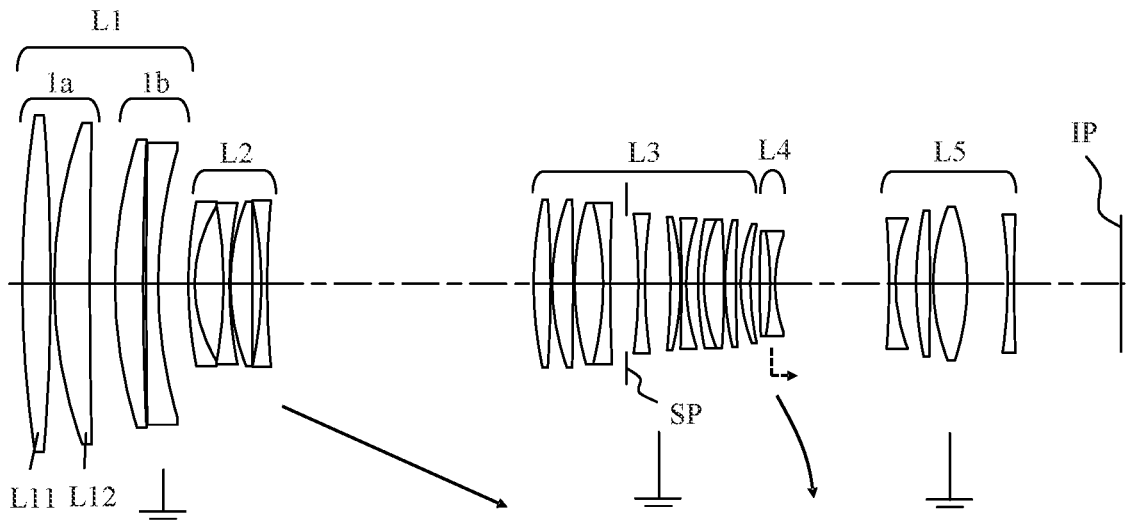
FIG. 3 is a sectional view of a zoom lens according to Example 2 at a wide-angle end.
Figure 4A:
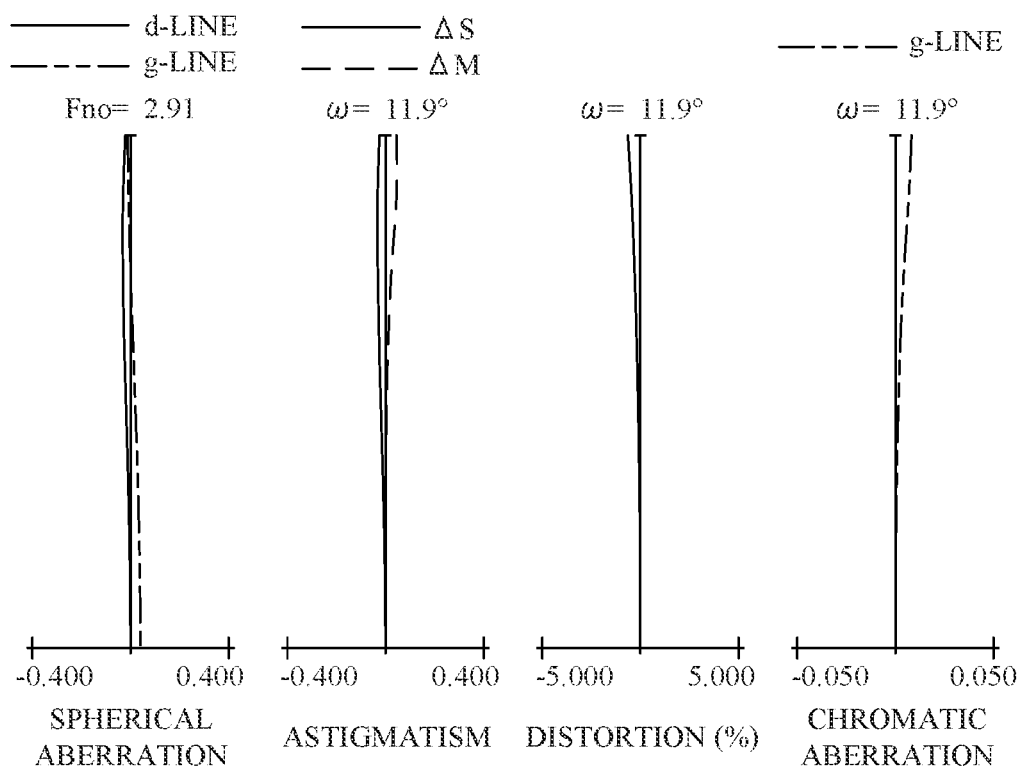
FIGS. 4A to 4C are aberration diagrams of the zoom lens according to Example 2 at the wide-angle end, a middle zoom position, and a telephoto end, respectively.
Figure 4B:
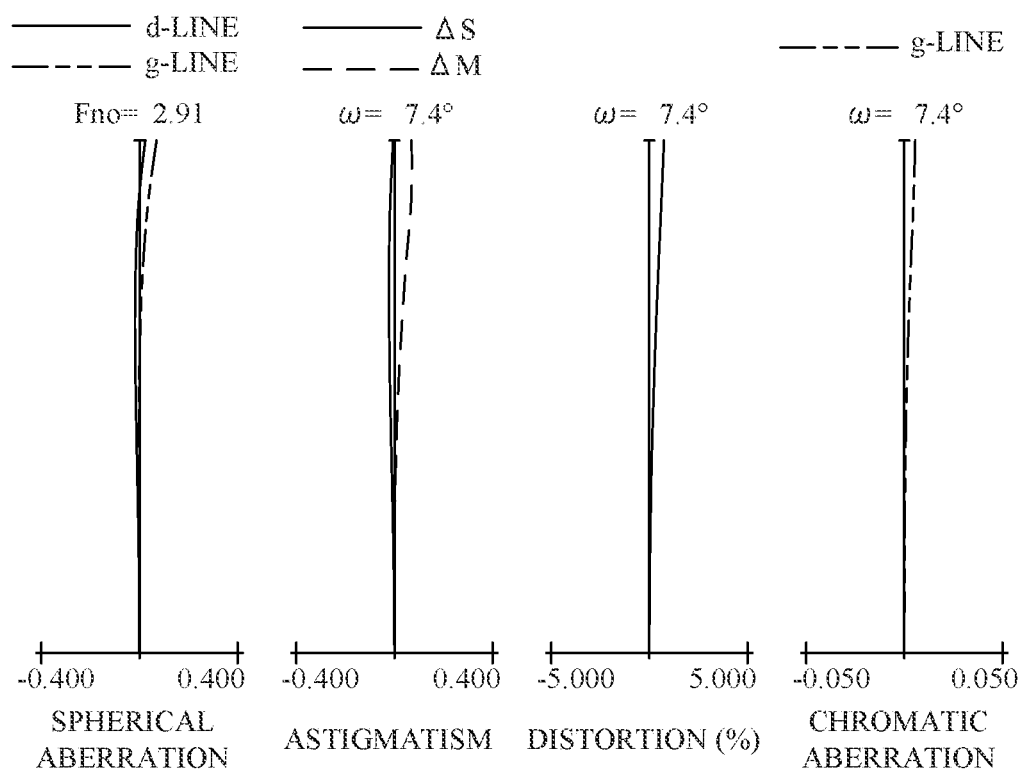
Figure 4C:
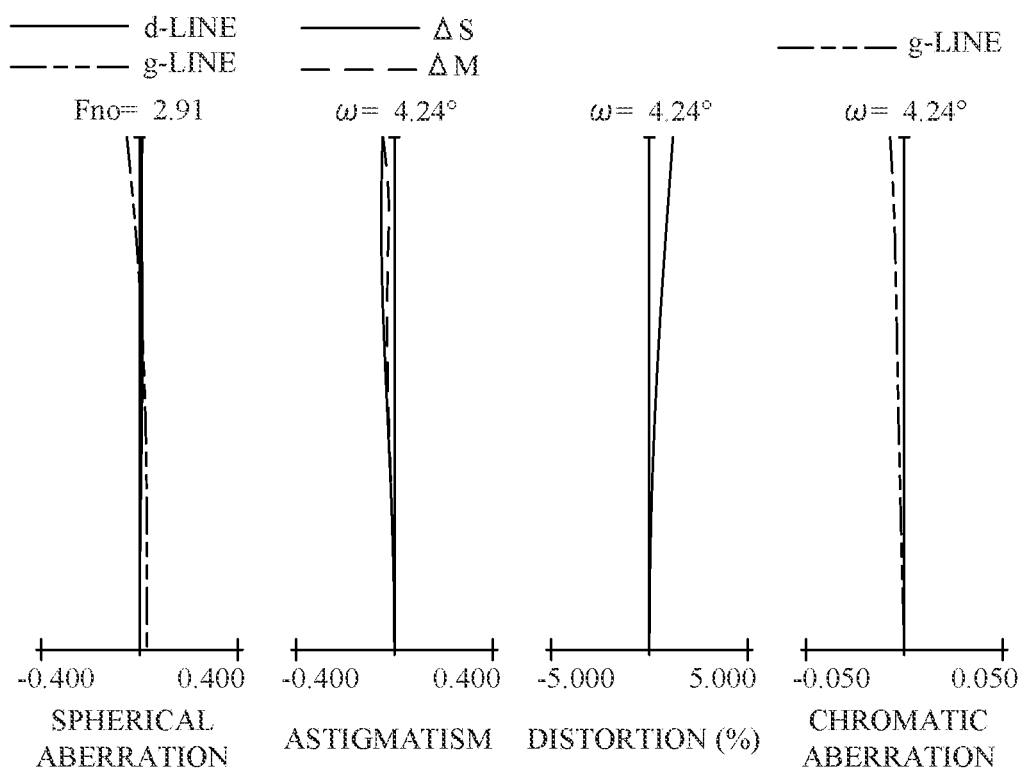
Figure 5:
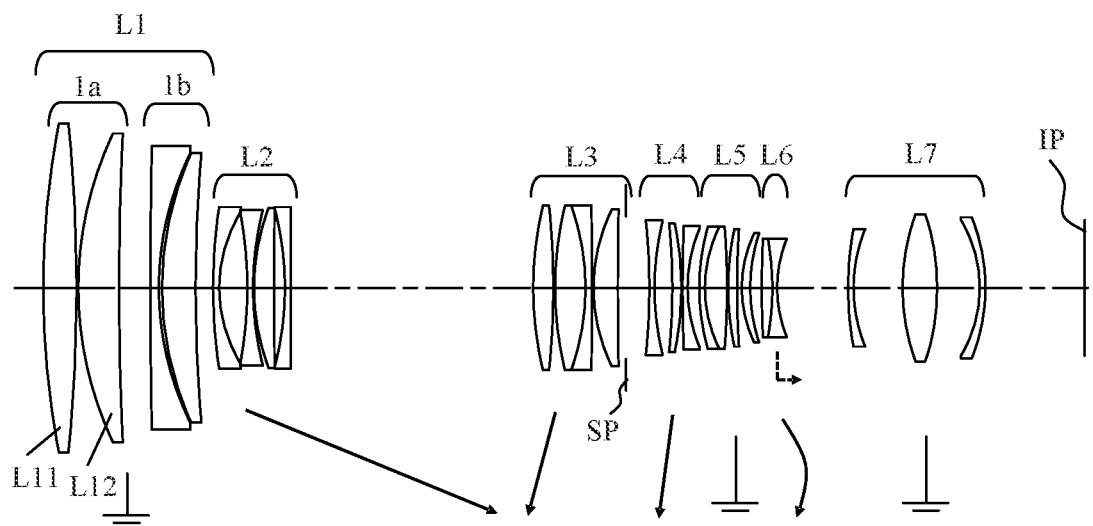
FIG. 5 is a sectional view of a zoom lens according to Example 3 at a wide-angle end.
Figure 6A:
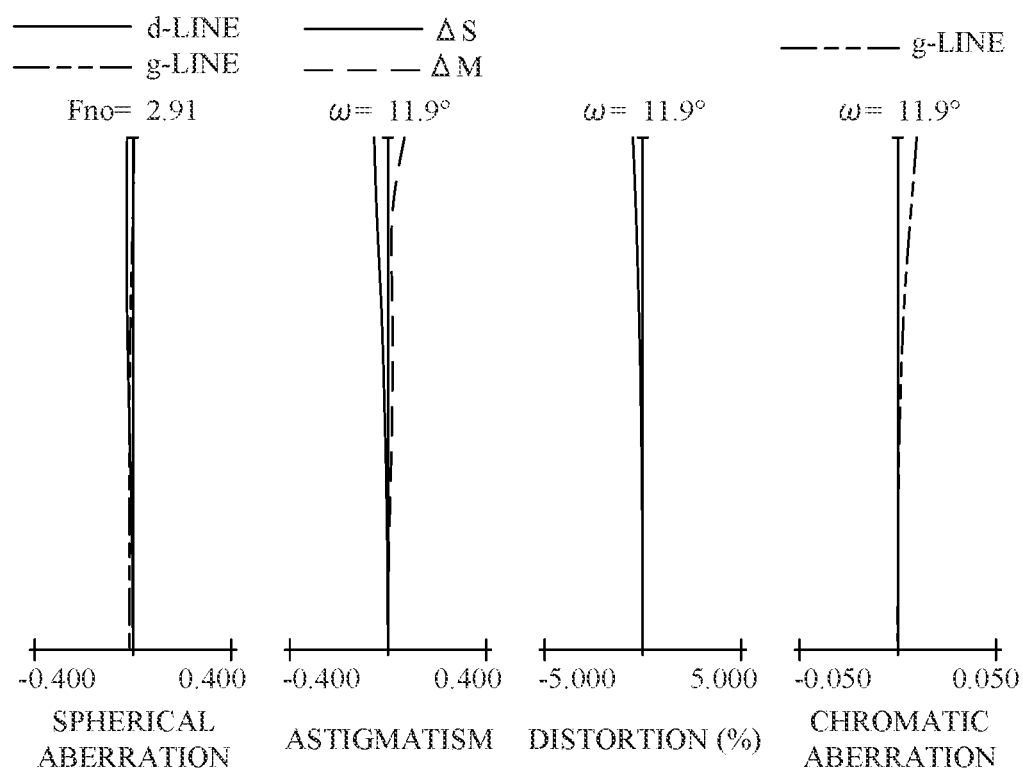
FIGS. 6A to 6C are aberration diagrams of the zoom lens according to Example 3 at the wide-angle end, a middle zoom position, and a telephoto end, respectively.
Figure 6B:
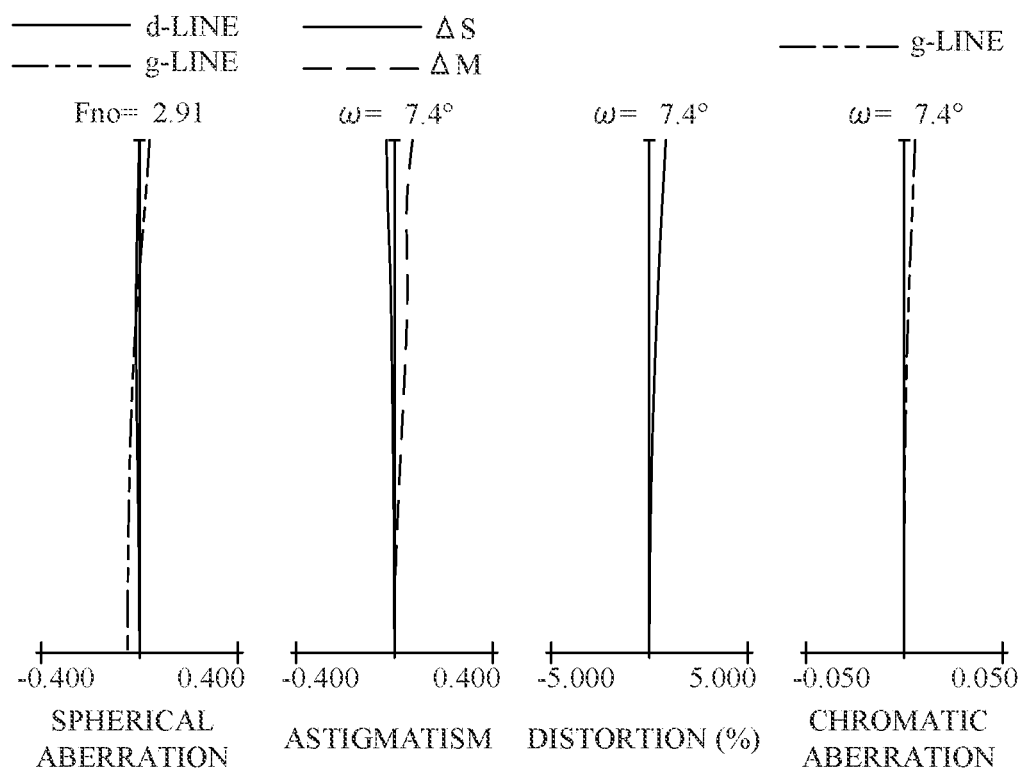
Figure 6C:
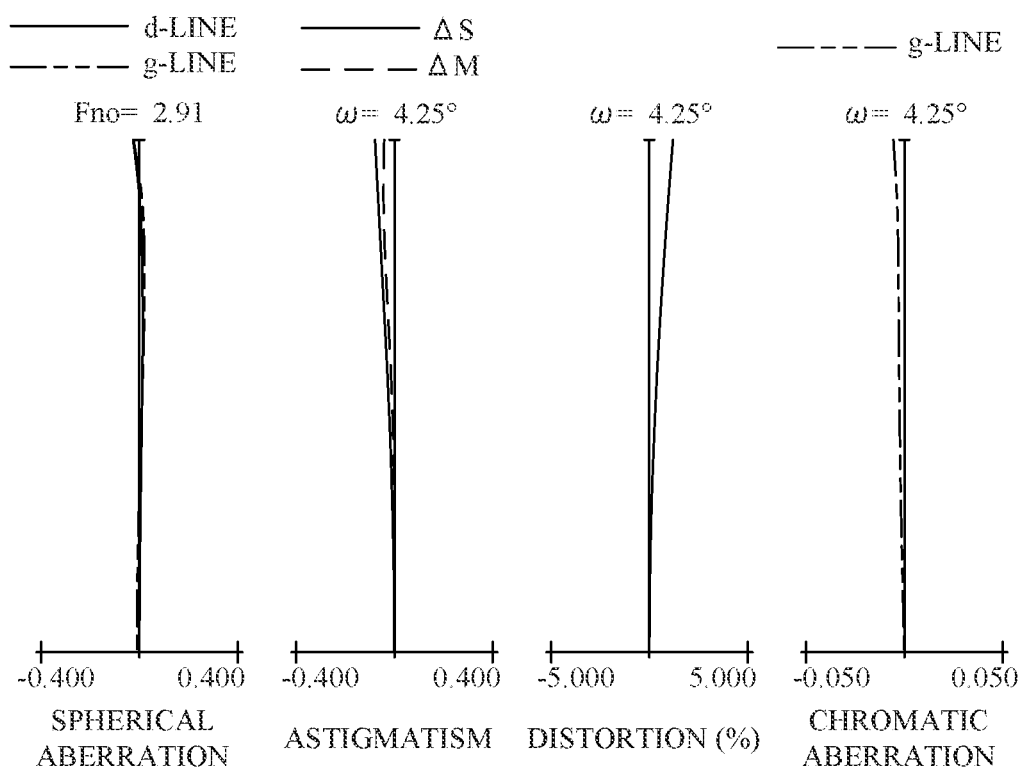
Figure 7:
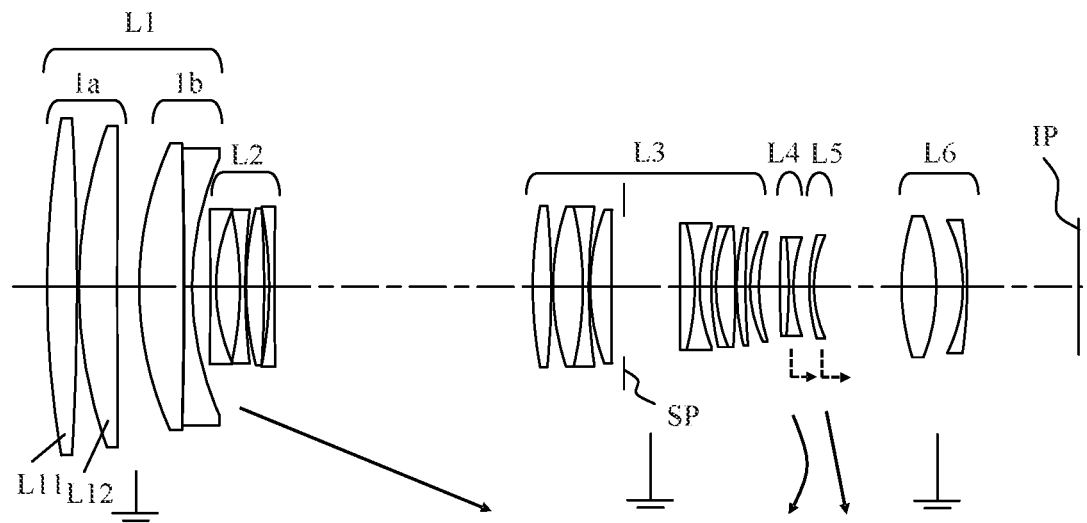
FIG. 7 is a sectional view of a zoom lens according to Example 4 at a wide-angle end.
Figure 8A:
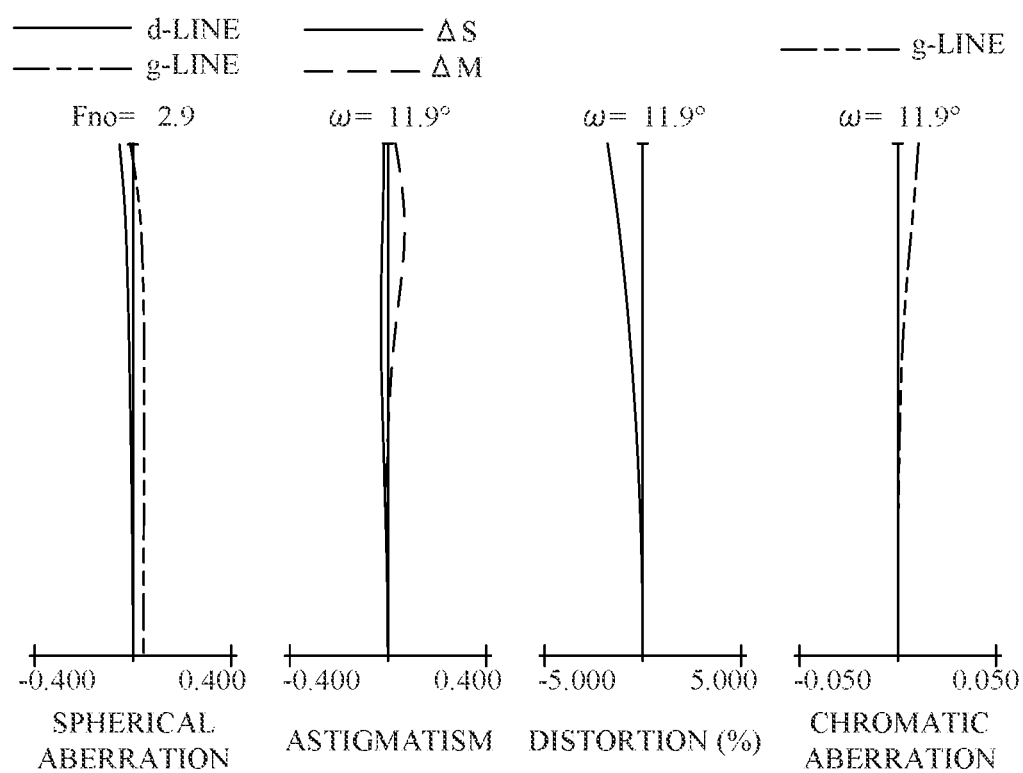
FIGS. 8A to 8C are aberration diagrams of the zoom lens according to Example 4 at the wide-angle end, a middle zoom position, and a telephoto end, respectively.
Figure 8B:
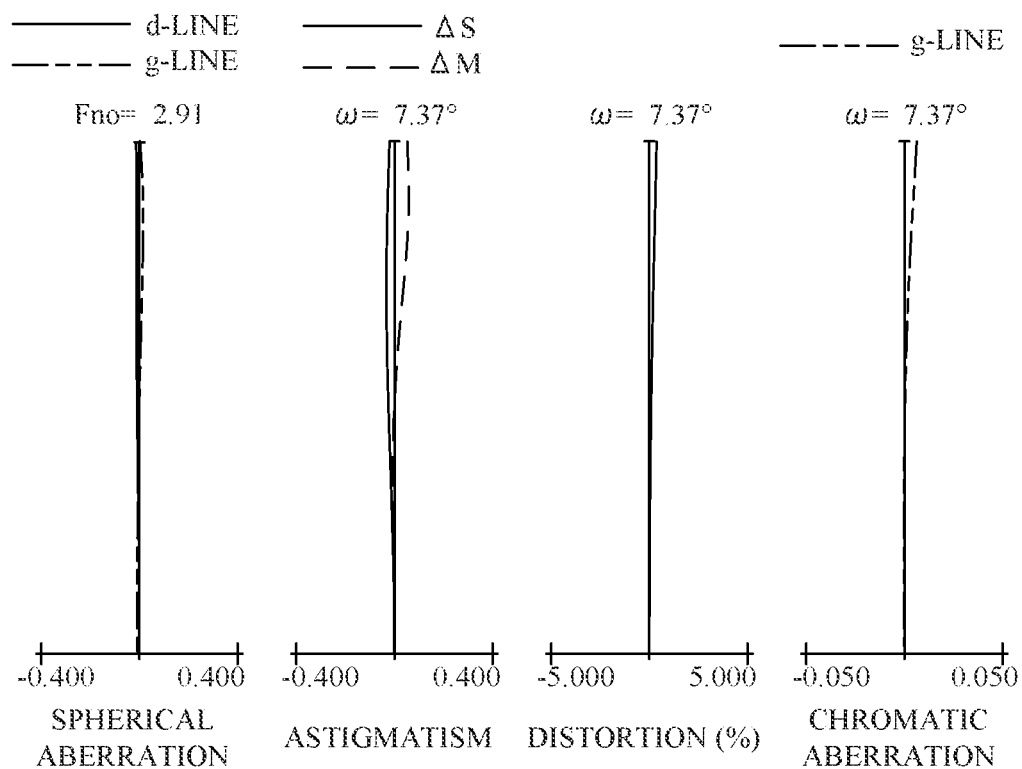
Figure 8C:
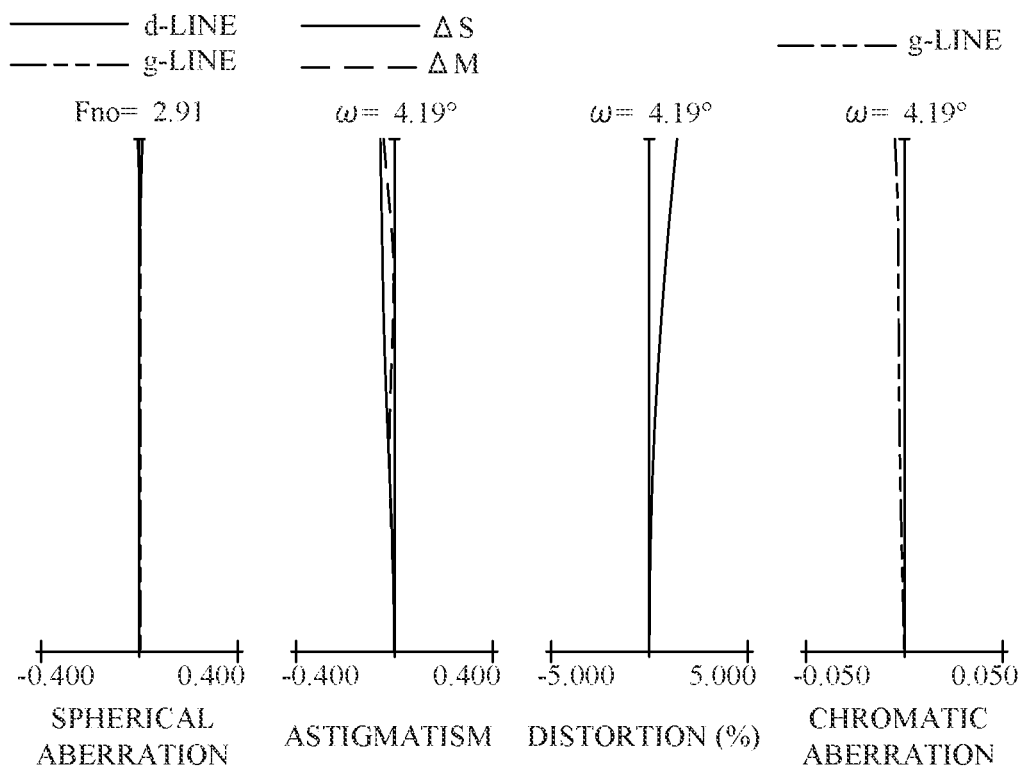

Referring now to the accompanying drawings, a detailed description will be given of embodiments according to the disclosure. Corresponding elements in respective figures will be designated by the same reference numerals, and a duplicate description thereof will be omitted.

FIGS. 1, 3, 5 and 7 are sectional views of zoom lenses according to Examples 1 to 4 at a wide-angle end, respectively. The zoom lens according to each example is used for an optical apparatus including an interchangeable lens and an image pickup apparatus, such as a digital video camera, a digital still camera, a broadcasting camera, a film-based camera, and a surveillance camera.

In each sectional view, a left side is an object side and a right side is an image side. The zoom lens according to each example includes a plurality of lens units. In the specification of the disclosure, a lens unit is a group of lenses that are integrally moved or fixed during zooming. That is, in the zoom lens according to each example, a distance between adjacent lens units changes during zooming. The lens unit may include one or more lenses. The lens unit may include an aperture stop.

The zoom lens according to each example includes, in order from the object side to the image side, a first lens unit L1 having positive refractive power, a second lens unit L2 having negative refractive power, and a subsequent unit that includes a plurality of lens units.

In each sectional view, Li denotes an i-th lens unit (where i is a natural number) counted from the object side among lens units included in the zoom lens.

SP denotes an aperture stop. IP denotes an image plane. In a case where the zoom lens according to each example is used as an imaging optical system of a digital still camera or a digital video camera, an imaging plane of a solid-state image sensor (photoelectric conversion element) such as a CCD sensor or a CMOS sensor is placed there. In a case where the zoom lens according to each example is used for an imaging optical system of a film-based camera, a photosensitive plane corresponding to the film plane is placed on the image plane IP.

In the zoom lens according to each example, during zooming from the wide-angle end to the telephoto end, each lens unit is moved in a direction illustrated by a solid arrow. In the zoom lens according to each example, each lens unit is moved in a direction illustrated by a dotted arrow during focusing from an object at infinity (infinity object) to a close (or short-distance) object.

In the zoom lens according to each example, an optical image on the image plane can be displaced by moving a lens unit having positive refractive power or part of the lens unit displaced on the image side of the aperture stop SP in a direction including a component in a direction orthogonal to the optical axis. By utilizing this, image blur can be corrected on the image plane in a case where vibration such as camera shake is applied to the zoom lens serving as the imaging optical system.

FIGS. 2A, 4A, 6A, and 8A are aberration diagrams of the zoom lenses according to Examples 1 to 4, respectively, at the wide-angle end. FIGS. 2B, 4B, 6B, and 8B are aberration diagrams of the zoom lenses according to Examples 1 to 4, respectively, at a middle (intermediate) zoom position. FIGS. 2C, 4C, 6C, and 8C are aberration diagrams of the zoom lenses according to Examples 1 to 4, respectively, at the telephoto end. Each of the aberration diagrams illustrates an in-focus state at infinity.

In a spherical aberration diagram, Fno denotes an F-number, which indicates spherical aberration amounts for the d-line (wavelength 587.6 nm) and the g-line (wavelength 435.8 nm). In an astigmatism diagram, ΔS denotes an astigmatism amount on a sagittal image plane, and ΔM denotes an astigmatism amount on a meridional image plane. A distortion diagram illustrates a distortion amount for the d-line. A chromatic aberration diagram illustrates a chromatic aberration amount for the g-line. ω is an imaging half angle of view (degrees).

A description will now be given of a characteristic configuration of the zoom lens according to each example.

During zooming, the first lens unit L1 does not move (or is fixed) and the second lens unit L2 moves.

The first lens unit L1 includes, in order from the object side to the image side, a first subunit 1a and a second subunit 1b.

The first subunit 1a includes two positive lenses. In order to make smaller a lens diameter of a lens unit disposed on the image side of the first subunit 1a closest to the object, it is necessary to properly converge an on-axis light beam (luminous flux) at the telephoto end. In that case, the first subunit 1a needs strong positive refractive power, but a single positive lens has difficulty in reducing various aberrations such as spherical aberration and longitudinal chromatic aberration at the telephoto end and thus a plurality of lenses are required. If the first subunit 1a has three or more lenses, the above various aberrations can be suppressed but the first subunit 1a becomes heavy. In order to achieve convergence of the on-axis light beam, suppression of various aberrations, and weight reduction of the first subunit 1a, the first subunit 1a may include two positive lenses.

The second subunit 1b includes a single positive lens and a single negative lens. In order to satisfactorily correct various aberrations generated in the first subunit 1a, the second subunit 1b may include a negative lens. The second subunit 1b may have weak negative refractive power so as to maintain the convergence effect of the on-axis light beam by the first subunit 1a while various aberrations are well corrected. In order to reduce the weight of the second subunit 1b while these conditions are satisfied, the second subunit 1b may include a single positive lens and a single negative lens.

The zoom lens according to each example satisfies the following inequalities (1) and (2).

$$-0.45 < f1a/f1b < -0.10 \quad (1)$$

$$-5.50 < f1/f2 < -3.00 \quad (2)$$

where f1a is a focal length of the first subunit 1a, f1b is a focal length of the second subunit 1b, f1 is a focal length of the first lens unit L1, and f2 is a focal length of the second lens unit L2.

Inequality (1) determines a ratio between the focal length of the first subunit 1a and the focal length of the second subunit 1b in order to reduce the weight of the second subunit 1b and to satisfactorily correct spherical aberration, longitudinal chromatic aberration, and lateral chromatic aberration at the telephoto end. In a case where the focal length of the first subunit 1a is so long that the value is lower than the lower limit of inequality (1), the on-axis light beam incident on the second subunit 1b cannot be fully converged, the lens diameter increases, and it becomes difficult to reduce the weight of the second subunit 1b. In a case where the focal length of the first subunit 1a is so short that the value is higher than the upper limit of inequality (1), it becomes difficult to correct spherical aberration, longitudinal chromatic aberration, and lateral chromatic aberration at the telephoto end.

Inequality (2) defines a ratio between the focal length of the first lens unit L1 and the focal length of the second lens unit L2 in order to achieve both weight reduction and high optical performance of the zoom lens. In a case where the focal length of the first lens unit L1 becomes so long that the value is lower than the lower limit of inequality (2), a lens diameter of a lens unit after the second lens unit L2 disposed on the image side of the first lens unit L1, is increased, and it becomes difficult to reduce the weight of the zoom lens. In a case where the focal length of the second lens unit L2 is so short that the value is lower than the lower limit of inequality (2), it becomes difficult to correct off-axis aberrations such as coma and curvature of field at the wide-angle end. In a case where the focal length of the first lens unit L1 is so short that the value is higher than the upper limit of inequality (2), it becomes difficult to correct longitudinal and lateral chromatic aberrations at the telephoto end. In a case where the focal length of the second lens unit L2 is so long that the value is higher than the upper limit of inequality (2), the overall length of the zoom lens becomes longer and the zoom lens becomes larger.

Inequalities (1) and (2) may be replaced with inequalities (1a) and (2a) below.

$$-0.42 < f1a/f1b < -0.15 \quad (1a)$$

$$-4.80 < f1/f2 < -3.15 \quad (2a)$$

Inequalities (1) and (2) may be replaced with inequalities (1b) and (2b) below.

$$-0.39 < f1a/f1b < -0.20 \quad (1b)$$

$$-4.00 < f1/f2 < -3.30 \quad (2b)$$

A description will now be given of conditions that the zoom lens according to each example may satisfy. The zoom lens according to each example may satisfy one or more of the following inequalities (3) to (8):

$$0.60 < f1/ft < 1.10 \quad (3)$$

$$0.05 < D1ab/D1 < 0.25 \quad (4)$$

$$0.50 < f12/f11 < 1.00 \quad (5)$$

$$0.20 < M2/ft < 0.35 \quad (6)$$

$$75 < vd1ave < 100 \quad (7)$$

$$-0.90 < f2/fw < -0.50 \quad (8)$$

Here, ft is a focal length of the zoom lens at the telephoto end. D1ab is a distance on the optical axis from a lens surface closest to the image plane of the first subunit 1a to a lens surface closest to the object of the second subunit 1b. D1 is a distance on the optical axis from a lens surface closest to the object of the first lens unit L1 to a lens surface closest to the image plane of the first lens unit L1. f11 is a focal length of the positive lens L11 disposed on the object side in the first subunit 1a. f12 is a focal length of the positive lens L12 disposed on the image side in the first subunit 1a. M2 is a moving amount of the second lens unit L2 during zooming from the wide-angle end to the telephoto end where a direction moving to the image side is set positive. vd1ave is an average of the Abbe numbers with respect to the d-line of all positive lenses included in the first lens unit L1. fw is a focal length of the zoom lens at the wide-angle end.

In order to shorten the overall length of the zoom lens and correct spherical aberration, longitudinal chromatic aberration, and lateral chromatic aberration at the telephoto end, inequality (3) defines a ratio between the focal length of the first lens unit L1 and the focal length of the zoom lens at the telephoto end. In a case where the focal length of the first lens unit L1 becomes so short that the value is lower than the lower limit of inequality (3), it becomes difficult to correct spherical aberration, longitudinal chromatic aberration, and lateral chromatic aberration at the telephoto end. In a case where the focal length of the first lens unit L1 is so long that the value is higher than the upper limit of inequality (3), the overall length of the zoom lens will increase and the zoom lens becomes larger.

In order to reduce the weight of the second subunit 1b and correct spherical aberration, longitudinal chromatic aberration, and lateral chromatic aberration at the telephoto end, inequality (4) defines an arrangement of the first subunit 1a and the second subunit 1b. In a case where the distance from the lens surface closest to the image plane in the first subunit 1a to the lens surface closest to the object in the second subunit 1b becomes so short that the value is lower than the lower limit of inequality (4), the on-axis light beam incident on the second subunit 1b cannot be fully converged. As a result, the lens diameter of the second subunit 1b increases, and it becomes difficult to reduce the weight of the second subunit 1b. In a case where the distance from the lens surface closest to the image plane in the first subunit 1a to the lens surface closest to the object in the second subunit 1b is so long that the value is higher than the upper limit of inequality (4), it becomes difficult to correct spherical aberration, longitudinal chromatic aberration, and lateral chromatic aberration at the telephoto end.

Inequality (5) defines a ratio between the focal length of positive lens L11 and the focal length of positive lens L12 in order to satisfactorily correct spherical aberration and longitudinal chromatic aberration at the telephoto end. In a case where the focal length of the positive lens L12 is so short that the value is lower than the lower limit of inequality (5), it becomes difficult to correct spherical aberration and longitudinal chromatic aberration at the telephoto end. In a case where the focal length of L11 is so short that the value is higher than the upper limit of inequality (5), it becomes difficult to correct spherical aberration and longitudinal chromatic aberration at the telephoto end.

Inequality (6) defines a ratio between a moving amount of the second lens unit L2 during zooming and the focal length of the zoom lens at the telephoto end, in order to reduce the overall length of the zoom lens and satisfactorily correct longitudinal chromatic aberration at the telephoto end. In a case where the moving amount of the second lens unit L2 during zooming is so small that the value is lower than the lower limit of inequality (6), the refractive power of the second lens unit L2 becomes too strong to obtain a sufficient magnification-varying ratio and it becomes difficult to correct longitudinal chromatic aberration at the telephoto end. In a case where the moving amount of the second lens unit L2 during zooming is so large that the value is higher than the upper limit of conditional expression (6), the zoom lens becomes larger.

Inequality (7) defines an average of Abbe numbers with respect to the d-line of all positive lenses included in the first lens unit L1, in order to satisfactorily correct longitudinal and lateral chromatic aberrations at the telephoto end. In a case where the average of the Abbe numbers with respect to the d-line of all the positive lenses included in the first lens unit L1 is so small that the value is lower than the lower limit of inequality (7), it becomes difficult to correct the longitudinal and lateral chromatic aberrations at the telephoto end. In a case where the average of the Abbe numbers with respect to the d-line of all positive lenses included in the first lens unit L1 is so large that the value is higher than the upper limit of inequality (7), the longitudinal and lateral chromatic aberrations at the telephoto end can be satisfactorily corrected. However, the refractive index of existing glass materials becomes too small, and it becomes difficult to correct spherical aberration at the telephoto end.

Inequality (8) defines a ratio between the focal length of the second lens unit L2 and the focal length of the zoom lens at the wide-angle end, in order to reduce the weight of the second lens unit L2 and correct off-axis aberrations such as coma and curvature of field at the wide-angle end. In a case where the focal length of the second lens unit L2 is so long that the value is lower than the lower limit of inequality (8), the lens diameter of the second lens unit L2 increases, and it becomes difficult to reduce the weight of the second lens unit L2. In a case where the focal length of the second lens unit L2 is so short that the value is higher than the upper limit of inequality (8), it becomes difficult to correct off-axis aberrations such as coma and curvature of field at the wide-angle end.

Inequalities (3) to (8) may be replaced with inequalities (3a) to (8a) below.

$$0.70 < f1/ft < 1.00 \quad (3a)$$

$$0.10 < D1ab/D1 < 0.23 \quad (4a)$$

$$0.58 < f11/f12 < 0.92 \quad (5a)$$

$$0.23 < M2/ft < 0.32 \quad (6a)$$

$$78 < vd1ave < 95 \quad (7a)$$

$$-0.82 < f2/fw < -0.58 \quad (8a)$$

Inequalities (3) to (8) may be replaced with inequalities (3b) to (8b) below.

$$0.80 < f1/ft < 0.96 \quad (3b)$$

$$0.15 < D1ab/D1 < 0.21 \quad (4b)$$

$$0.66 < f11/f12 < 0.85 \quad (5b)$$

$$0.25 < M2/ft < 0.30 \quad (6b)$$

$$81 < vd1ave < 90 \quad (7b)$$

$$-0.75 < f2/fw < -0.65 \quad (8b)$$

A detailed description will be given of the zoom lens according to each example.

The zoom lens according to Example 1 is a seven-unit zoom lens in which the subsequent unit includes, in order from the object side to the image side, the third lens unit L3 to the seventh lens unit L7 having positive, positive, negative, negative, positive refractive powers. In the zoom lens according to Example 1, during zooming from the wide-angle end to the telephoto end, the second lens unit L2 moves toward the image side, the third lens unit L3 moves toward the object side, the fifth lens unit L5 moves toward the object side with a locus that is convex toward the image side, and the sixth lens unit L6 moves to the image side. The first lens unit L1, the fourth lens unit L4, and the seventh lens unit L7 do not move during zooming. Focusing is performed by the fifth and sixth lens units L5 and L6 moving with different loci. More specifically, during focusing from an object at infinity (infinity object) to a close (short-distance) object, the fifth lens unit L5 and the sixth lens unit L6 move toward the image side.

The zoom lens according to Example 2 is a five-unit zoom lens in which the subsequent unit includes, in order from the object side to the image side, the third lens unit L3 to the fifth lens unit L5 having positive, negative, and positive refractive powers. In the zoom lens according to Example 2, during zooming from the wide-angle end to the telephoto end, the second lens unit L2 moves toward the image side, and the fourth lens unit L4 moves toward the object side. The first lens unit L1, third lens unit L3, and fifth lens unit L5 do not move (are fixed) during zooming. In the zoom lens according to Example 2, focusing is performed by moving the fourth lens unit L4. More specifically, during focusing from an infinity object to a close object, the fourth lens unit L4 moves toward the image side.

The zoom lens according to Example 3 is a seven-unit zoom lens in which the subsequent unit includes, in order from the object side to the image side, the third lens unit L3 to the seventh lens unit L7 having positive, negative, positive, negative, positive refractive powers. In the zoom lens according to Example 3, during zooming from the wide-angle end to the telephoto end, the second lens unit L2 moves toward the image side, the third lens unit L3 and fourth lens unit L4 move toward the object side, and the sixth lens unit L6 moves with a locus that is convex toward the image side. The first lens unit L1, the fifth lens unit L5, and the seventh lens unit L7 do not move (are fixed) during zooming. In the zoom lens according to Example 3, focusing is performed by moving the sixth lens unit L6. More specifically, during focusing from an infinity object to a close object, the sixth lens unit L6 moves toward the image side.

The zoom lens according to Example 4 is a sixth-unit zoom lens in which the subsequent unit includes, in order from the object side to the image side, the third lens unit L3 to the sixth lens unit L6 having positive, negative, negative, and positive refractive powers. In the zoom lens according to Example 4, during zooming from the wide-angle end to the telephoto end, the second lens unit L2 moves toward the image side, the fourth lens unit L4 moves toward the object side with a locus that is convex toward the image side, and the fifth lens unit L5 moves toward the image side. The first lens unit L1, the third lens unit L3, and the sixth lens unit L6 do not move (are fixed) during zooming. In the zoom lens according to Example 4, focusing is performed by moving the fourth lens unit L4 and the fifth lens unit L5 with different loci. More specifically, during focusing from an infinity object to a close object, the fourth lens unit L4 and the fifth lens unit L5 move toward the image side.

In the zoom lens according to each example, the second lens unit L2 includes, in order from the object side to the image side, a negative lens, a negative lens, a positive lens, and a negative lens. Due to such a configuration, coma and curvature of field at the wide-angle end can be satisfactorily corrected, sufficient negative refractive power can be obtained, and thus the weight reduction of the second lens unit L2 can be achieved.

In the zoom lens according to each example, the aperture stop SP is disposed between the third lens unit L3 and the fourth lens unit L4, or within the third lens unit L3.

At least one lens unit other than the fourth lens unit L4 through the sixth lens unit L6 may be moved during focusing.

In surface data in each numerical example, r denotes a radius of curvature of each optical surface, and d (mm) denotes an on-axis distance (distance on the optical axis) between an m-th surface and an (m+1)-th surface, where m is a surface number counted from the light incident side. nd denotes a refractive index for the d-line of each optical element, and vd denotes an Abbe number of the optical element. The Abbe number vd of a certain material is expressed as follows:

$$vd = (Nd-1)/(NF-NC)$$

where Nd, NF, and NC are refractive indexes based on the d-line (587.6 nm), the F-line (486.1 nm), and the C-line (656.3 nm) in the Fraunhofer line, respectively.

In each numerical example, each of d, focal length (mm), F-number, and half angle of view (degrees) has a value in a case where the zoom lens L0 according to each example is in the in-focus state on an object at infinity (infinity object). A "back focus" is a distance on the optical axis from the final lens surface (the lens surface closest to the image plane) to a paraxial image plane in terms of air equivalent length. An "overall lens length" is a length obtained by adding the back focus to a distance on the optical axis from the frontmost surface (lens surface closest to the object) to the final surface of the zoom lens.

In a case where the optical surface is aspherical, an asterisk * is attached to the right side of the surface number. The aspherical shape is expressed as follows:

$$X = (h^2/R)/[1+\{1-(1+K)(h/R)^2\}^{1/2}] + A4 \times h^4 + A6 \times h^6 + A8 \times h^8 + A10 \times h^{10} + A12 \times h^{12}$$

where X is a displacement amount from a surface vertex in the optical axis direction, h is a height from the optical axis in a direction orthogonal to the optical axis, R is a paraxial radius of curvature, K is a conical constant, A4, A6, A8, A10, and A12 are aspherical coefficients of respective orders. "e±XX" in each aspherical coefficient means "×10$^{\pm XX}$."

NUMERICAL EXAMPLE 1

| | UNIT: mm | | | |
|---|---|---|---|---|
| | Surface Data | | | |
| Surface No. | r | d | nd | vd |
| 1 | 435.360 | 8.41 | 1.48749 | 70.2 |
| 2 | −570.557 | 1.00 | | |
| 3 | 144.875 | 11.51 | 1.43875 | 94.7 |
| 4 | 3213.208 | 8.50 | | |
| 5 | 113.847 | 13.56 | 1.49700 | 81.5 |
| 6 | −847.524 | 2.70 | 1.61340 | 44.3 |
| 7 | 107.418 | (Variable) | | |
| 8 | 3163.839 | 2.00 | 1.59270 | 35.3 |
| 9 | 57.405 | 8.36 | | |
| 10 | −101.612 | 1.80 | 1.49700 | 81.5 |
| 11 | 161.066 | 0.30 | | |
| 12 | 100.360 | 6.63 | 1.85478 | 24.8 |
| 13 | −264.182 | 2.39 | | |
| 14 | −115.832 | 1.80 | 1.69680 | 55.5 |
| 15 | 491.399 | (Variable) | | |
| 16 | 249.103 | 5.99 | 1.49700 | 81.5 |
| 17 | −128.650 | 0.50 | | |
| 18 | 129.745 | 9.76 | 1.49700 | 81.5 |
| 19 | −74.540 | 2.00 | 1.67300 | 38.3 |
| 20 | −1333.860 | 0.50 | | |
| 21 | 54.405 | 7.50 | 1.49700 | 81.5 |
| 22 | 433.835 | (Variable) | | |
| 23(SP) | ∞ | 10.28 | | |
| 24 | −148.769 | 1.60 | 1.51633 | 64.1 |
| 25 | 69.371 | 9.58 | | |
| 26 | 1901.045 | 4.10 | 1.85478 | 24.8 |
| 27 | −96.905 | 2.00 | | |
| 28 | 5198.592 | 1.60 | 1.90366 | 31.3 |
| 29 | 59.212 | 3.83 | | |
| 30 | 70.488 | 1.80 | 1.80810 | 22.8 |
| 31 | 44.138 | 6.84 | 1.59282 | 68.6 |
| 32 | −205.857 | 0.30 | | |
| 33 | 71.584 | 2.85 | 1.80400 | 46.5 |
| 34 | 163.001 | 1.50 | | |
| 35 | 41.273 | 2.29 | 1.83481 | 42.7 |
| 36 | 51.514 | (Variable) | | |
| 37 | 224.893 | 3.05 | 1.80810 | 22.8 |
| 38 | −149.874 | 1.50 | 1.77250 | 49.6 |
| 39 | 46.152 | (Variable) | | |
| 40 | 52.870 | 1.80 | 1.49700 | 81.5 |
| 41 | 37.091 | (Variable) | | |
| 42 | 90.301 | 9.64 | 1.58313 | 59.4 |
| 43* | −88.102 | 9.39 | | |
| 44 | −67.820 | 1.60 | 1.76182 | 26.5 |
| 45 | −155.784 | 31.93 | | |
| Image Plane | ∞ | | | |

| Aspheric Data |
|---|

43rd Surface
K = 0.00000e+00 A4 = −1.36103e−06 A 6 = −1.88328e−10 A 8 = 1.14944e−13
A10 = −5.86480e−18

| Various Data | | | |
|---|---|---|---|
| ZOOM RATIO 2.83 | | | |
| | WIDE-ANGLE | MIDDLE | TELEPHOTO |
| Focal Length | 103.00 | 166.42 | 292.00 |
| FNO | 2.90 | 2.91 | 2.91 |
| Half Angle of View (°) | 11.86 | 7.41 | 4.24 |
| Image Height | 21.64 | 21.64 | 21.64 |
| Overall lens length | 333.61 | 333.61 | 333.61 |
| BF | 31.93 | 31.93 | 31.93 |
| d 7 | 6.68 | 43.95 | 81.22 |
| d15 | 77.53 | 39.27 | 1.00 |
| d22 | 2.93 | 3.93 | 4.93 |

-continued

| UNIT: mm | | | |
|---|---|---|---|
| d36 | 3.63 | 7.01 | 3.60 |
| d39 | 8.11 | 5.49 | 9.73 |
| d41 | 32.06 | 31.28 | 30.45 |

| Zoom Lens Unit Data | | |
|---|---|---|
| Lens Unit | Starting Surface | Focal Length |
| 1 | 1 | 247.39 |
| 2 | 8 | −69.85 |
| 3 | 16 | 65.43 |
| 4 | 23 | 136.41 |
| 5 | 37 | −78.41 |
| 6 | 40 | −259.90 |
| 7 | 42 | 133.85 |

| First Lens Unit Lens Subunit Data | | |
|---|---|---|
| Lens Unit | Starting Surface | Focal Length |
| 1a | 1 | 206.52 |
| 1b | 5 | −826.03 |

| SINGLE LENS DATA | | |
|---|---|---|
| Lens | Starting Surface | Focal Length |
| 1 | 1 | 507.94 |
| 2 | 3 | 345.40 |
| 3 | 5 | 202.89 |
| 4 | 6 | −155.25 |

NUMERICAL EXAMPLE 2

| UNIT: mm | | | | |
|---|---|---|---|---|
| Surface Data | | | | |
| Surface No. | r | d | nd | vd |
| 1 | 357.911 | 9.12 | 1.48749 | 70.2 |
| 2 | −634.182 | 1.00 | | |
| 3 | 150.018 | 11.39 | 1.43875 | 94.7 |
| 4 | 1917.212 | 8.00 | | |
| 5 | 152.149 | 8.96 | 1.43875 | 94.7 |
| 6 | 940.309 | 1.00 | | |
| 7 | 2744.842 | 3.80 | 1.65412 | 39.7 |
| 8 | 150.564 | (Variable) | | |
| 9 | 136.590 | 2.00 | 1.59270 | 35.3 |
| 10 | 47.115 | 9.29 | | |
| 11 | −133.963 | 1.80 | 1.49700 | 81.5 |
| 12 | 130.618 | 0.30 | | |
| 13 | 71.551 | 6.90 | 1.85478 | 24.8 |
| 14 | 3712.290 | 2.97 | | |
| 15 | −121.136 | 1.80 | 1.76385 | 48.5 |
| 16 | 280.220 | (Variable) | | |
| 17 | 126.302 | 5.43 | 1.53775 | 74.7 |
| 18 | −382.910 | 0.50 | | |
| 19 | 78.163 | 6.65 | 1.49700 | 81.5 |
| 20 | −1358.820 | 0.50 | | |
| 21 | 92.143 | 9.10 | 1.49700 | 81.5 |
| 22 | −102.484 | 2.20 | 1.67300 | 38.3 |
| 23 | 491.679 | 5.15 | | |
| 24(SP) | ∞ | 3.90 | | |
| 25 | −159.232 | 2.00 | 1.61340 | 44.3 |
| 26 | 148.675 | 8.20 | | |
| 27 | −203.299 | 3.19 | 1.89286 | 20.4 |
| 28 | −85.684 | 0.30 | | |
| 29 | −657.804 | 1.50 | 1.80610 | 33.3 |
| 30 | 63.951 | 3.79 | | |
| 31 | 103.288 | 1.80 | 1.89286 | 20.4 |
| 32 | 54.282 | 6.49 | 1.69680 | 55.5 |
| 33 | −312.910 | 0.30 | | |

-continued

| UNIT: mm | | | | |
|---|---|---|---|---|
| 34 | 88.252 | 3.45 | 1.85150 | 40.8 |
| 35 | 468.597 | 1.50 | | |
| 36 | 51.674 | 3.07 | 1.72916 | 54.7 |
| 37 | 87.793 | (Variable) | | |
| 38 | 342.082 | 3.41 | 1.89286 | 20.4 |
| 39 | −96.736 | 1.50 | 1.85150 | 40.8 |
| 40 | 45.657 | (Variable) | | |
| 41 | −255.883 | 2.00 | 1.48749 | 70.2 |
| 42 | 57.060 | 6.57 | | |
| 43 | 113.451 | 4.43 | 1.71736 | 29.5 |
| 44 | 1269.534 | 1.00 | | |
| 45 | 66.805 | 10.89 | 1.53775 | 74.7 |
| 46 | −77.597 | 12.89 | | |
| 47 | −143.456 | 2.00 | 1.92286 | 18.9 |
| 48 | 575.681 | 34.04 | | |
| Image Plane | ∞ | | | |

| Various Data ZOOM RATIO 2.83 | | | |
|---|---|---|---|
| | WIDE-ANGLE | MIDDLE | TELEPHOTO |
| Focal Length | 103.00 | 166.66 | 292.00 |
| FNO | 2.91 | 2.91 | 2.91 |
| Half Angle of View (°) | 11.86 | 7.40 | 4.24 |
| Image Height | 21.64 | 21.64 | 21.64 |
| Overall lens length | 350.00 | 350.00 | 350.00 |
| BF | 34.04 | 34.04 | 34.04 |
| d 8 | 9.64 | 51.41 | 93.55 |
| d16 | 84.91 | 43.14 | 1.00 |
| d37 | 3.00 | 7.45 | 8.19 |
| d40 | 36.36 | 31.91 | 31.17 |

-continued

UNIT: mm

Zoom Lens Unit Data

| Lens Unit | Starting Surface | Focal Length |
|---|---|---|
| 1 | 1 | 279.79 |
| 2 | 9 | -73.63 |
| 3 | 17 | 63.84 |
| 4 | 38 | -64.60 |
| 5 | 41 | 171.50 |

-continued

UNIT: mm

First Lens Unit
Lens Subunit Data

| Lens Unit | Starting Surface | Focal Length |
|---|---|---|
| 1a | 1 | 208.29 |
| 1b | 5 | -636.76 |

SINGLE LENS DATA

| Lens | Starting Surface | Focal Length |
|---|---|---|
| 1 | 1 | 470.74 |
| 2 | 3 | 370.22 |
| 3 | 5 | 412.29 |
| 4 | 7 | -243.68 |

NUMERICAL EXAMPLE 3

UNIT: mm

Surface Data

| Surface No. | r | d | nd | vd |
|---|---|---|---|---|
| 1 | 276.211 | 10.69 | 1.49700 | 81.5 |
| 2 | -518.352 | 0.50 | | |
| 3 | 115.331 | 12.94 | 1.43875 | 94.7 |
| 4 | 972.244 | 10.00 | | |
| 5 | 2084.057 | 2.70 | 1.61340 | 44.3 |
| 6 | 97.100 | 1.00 | | |
| 7 | 103.768 | 10.69 | 1.48749 | 70.2 |
| 8 | 488.045 | (Variable) | | |
| 9 | 165.489 | 2.00 | 1.59270 | 35.3 |
| 10 | 46.079 | 8.98 | | |
| 11 | -129.707 | 1.80 | 1.49700 | 81.5 |
| 12 | 98.898 | 0.30 | | |
| 13 | 71.730 | 6.43 | 1.85478 | 24.8 |
| 14 | 1868.000 | 3.46 | | |
| 15 | -98.768 | 1.80 | 1.72916 | 54.7 |
| 16 | 5343.346 | (Variable) | | |
| 17 | 110.371 | 6.49 | 1.49700 | 81.5 |
| 18 | -239.050 | 0.50 | | |
| 19 | 111.257 | 9.72 | 1.49700 | 81.5 |
| 20 | -77.123 | 2.00 | 1.67003 | 47.2 |
| 21 | -3139.749 | 0.50 | | |
| 22 | 56.291 | 7.77 | 1.49700 | 81.5 |
| 23 | 1259.545 | 2.61 | | |
| 24(SP) | ∞ | (Variable) | | |
| 25 | -197.808 | 1.60 | 1.51633 | 64.1 |
| 26 | 88.977 | 5.71 | | |
| 27 | -197.618 | 2.92 | 1.84666 | 23.8 |
| 28 | -95.782 | 0.30 | | |
| 29 | 496.082 | 1.60 | 1.80100 | 35.0 |
| 30 | 48.826 | (Variable) | | |
| 31 | 69.734 | 1.80 | 1.80810 | 22.8 |
| 32 | 43.354 | 7.12 | 1.59282 | 68.6 |
| 33 | -222.407 | 0.30 | | |
| 34 | 90.771 | 2.83 | 1.88300 | 40.8 |
| 35 | 276.166 | 1.50 | | |
| 36 | 39.982 | 2.69 | 1.75500 | 52.3 |
| 37 | 54.702 | (Variable) | | |
| 38 | 304.669 | 3.39 | 1.80810 | 22.8 |
| 39 | -87.105 | 1.50 | 1.78590 | 44.2 |
| 40 | 41.289 | (Variable) | | |
| 41 | 99.492 | 1.80 | 1.49700 | 81.5 |
| 42 | 49.560 | 15.59 | | |

-continued

| UNIT: mm | | | | |
|---|---|---|---|---|
| 43 | 68.599 | 11.00 | 1.58313 | 59.4 |
| 44* | −86.039 | 13.62 | | |
| 45 | −42.027 | 1.80 | 1.80518 | 25.4 |
| 46 | −60.096 | 31.58 | | |
| Image Plane | ∞ | | | |

Aspheric Data

44th Surface
K = 0.00000e+00 A 4 = −1.63430e−06 A 6 = −3.85253e−10 A 8 = 1.42947e−13
A10 = −2.55937e−17

Various Data
ZOOM RATIO 2.83

| | WIDE-ANGLE | MIDDLE | TELEPHOTO |
|---|---|---|---|
| Focal Length | 103.00 | 166.61 | 291.00 |
| FNO | 2.91 | 2.91 | 2.91 |
| Half Angle of View (°) | 11.86 | 7.40 | 4.25 |
| Image Height | 21.64 | 21.64 | 21.64 |
| Overall lens length | 331.70 | 331.70 | 331.70 |
| BF | 31.58 | 31.58 | 31.58 |
| d 8 | 5.53 | 41.98 | 78.75 |
| d16 | 77.22 | 39.38 | 1.20 |
| d24 | 7.48 | 7.74 | 8.01 |
| d30 | 3.71 | 4.84 | 5.97 |
| d37 | 3.68 | 7.39 | 5.47 |
| d40 | 22.55 | 18.84 | 20.76 |

Zoom Lens Unit Data

| Lens Unit | Starting Surface | Focal Length |
|---|---|---|
| 1 | 1 | 242.51 |
| 2 | 9 | −67.36 |
| 3 | 17 | 60.18 |
| 4 | 25 | −51.69 |
| 5 | 31 | 47.95 |
| 6 | 38 | −62.55 |
| 7 | 41 | 162.50 |

First Lens Unit
Lens Subunit Data

| Lens Unit | Starting Surface | Focal Length |
|---|---|---|
| 1a | 1 | 164.54 |
| 1b | 5 | −432.99 |

SINGLE LENS DATA

| Lens | Starting Surface | Focal Length |
|---|---|---|
| 1 | 1 | 364.19 |
| 2 | 3 | 296.88 |
| 3 | 5 | −166.12 |
| 4 | 7 | 267.90 |

NUMERICAL EXAMPLE 4

| UNIT: mm | | | | |
|---|---|---|---|---|
| Surface Data | | | | |
| Surface No. | r | d | nd | vd |
| 1 | 318.412 | 9.60 | 1.48749 | 70.2 |
| 2 | −861.108 | 0.50 | | |
| 3 | 150.245 | 12.24 | 1.43387 | 95.1 |
| 4 | 9401.300 | 7.00 | | |
| 5 | 111.079 | 14.21 | 1.49700 | 81.5 |
| 6 | −1731.157 | 0.20 | | |
| 7 | −1429.819 | 2.40 | 1.61340 | 44.3 |

-continued

| UNIT: mm | | | | |
|---|---|---|---|---|
| 8 | 100.324 | (Variable) | | |
| 9 | −6502.891 | 1.80 | 1.58144 | 40.8 |
| 10 | 58.931 | 7.68 | | |
| 11 | −110.449 | 1.60 | 1.49700 | 81.5 |
| 12 | 198.706 | 0.30 | | |
| 13 | 101.587 | 5.82 | 1.85478 | 24.8 |
| 14 | −370.711 | 1.60 | | |
| 15 | −131.451 | 1.60 | 1.76385 | 48.5 |
| 16 | 885.349 | (Variable) | | |
| 17 | 139.669 | 5.94 | 1.49700 | 81.5 |
| 18 | −250.111 | 0.50 | | |
| 19 | 79.286 | 9.55 | 1.49700 | 81.5 |
| 20 | −110.681 | 1.80 | 1.78590 | 44.2 |
| 21 | 168.957 | 0.50 | | |
| 22 | 67.931 | 6.88 | 1.49700 | 81.5 |
| 23 | 8851.483 | 3.89 | | |
| 24(SP) | ∞ | 17.94 | | |
| 25 | 18059.683 | 4.63 | 1.84666 | 23.8 |
| 26 | −78.373 | 1.50 | 1.72342 | 38.0 |
| 27 | 50.231 | 3.73 | | |
| 28 | 86.093 | 1.50 | 1.89286 | 20.4 |
| 29 | 49.267 | 6.22 | 1.72916 | 54.7 |
| 30 | −265.136 | 0.30 | | |
| 31 | 77.830 | 2.83 | 1.80400 | 46.5 |
| 32 | 190.511 | 1.50 | | |
| 33 | 38.860 | 2.83 | 1.65160 | 58.5 |
| 34 | 55.133 | (Variable) | | |
| 35 | 334.840 | 2.79 | 1.89286 | 20.4 |
| 36 | −158.150 | 1.50 | 1.77250 | 49.6 |
| 37 | 46.681 | (Variable) | | |
| 38 | 57.104 | 1.50 | 1.75500 | 52.3 |
| 39 | 39.022 | (Variable) | | |
| 40 | 74.395 | 11.11 | 1.58313 | 59.4 |
| 41* | −70.264 | 8.49 | | |
| 42 | −46.660 | 1.40 | 1.64769 | 33.8 |
| 43 | −141.783 | 35.45 | | |
| Image Plane | ∞ | | | |

Aspheric Data

41st Surface
K = 0.00000e+00 A 4 = −1.73775e−06 A 6 = 1.43818e−10 A 8 = −1.24546e−12
A10 = 1.73713e−15 A12 = −5.94146e−19

Various Data
ZOOM RATIO 2.86

| | WIDE-ANGLE | MIDDLE | TELEPHOTO |
|---|---|---|---|
| Focal Length | 103.00 | 167.33 | 295.00 |
| FNO | 2.90 | 2.91 | 2.91 |
| Half Angle of View (°) | 11.86 | 7.37 | 4.19 |
| Image Height | 21.64 | 21.64 | 21.64 |
| Overall lens length | 328.58 | 328.58 | 328.58 |
| BF | 35.45 | 35.45 | 35.45 |
| d 8 | 5.83 | 46.30 | 87.14 |
| d16 | 82.31 | 41.84 | 1.00 |
| d34 | 6.72 | 9.37 | 4.67 |
| d37 | 5.01 | 4.20 | 9.54 |
| d39 | 27.90 | 26.05 | 25.41 |

Zoom Lens Unit Data

| Lens Unit | Starting Surface | Focal Length |
|---|---|---|
| 1 | 1 | 256.11 |
| 2 | 9 | −75.32 |
| 3 | 17 | 64.55 |

-continued

UNIT: mm

| 4 | 35 | −76.86 |
| 5 | 38 | −169.27 |
| 6 | 40 | 123.41 |

First Lens Unit
Lens Subunit Data

| Lens Unit | Starting Surface | Focal Length |
| --- | --- | --- |
| 1a | 1 | 203.91 |
| 1b | 5 | −680.08 |

SINGLE LENS DATA

| Lens | Starting Surface | Focal Length |
| --- | --- | --- |
| 1 | 1 | 478.12 |
| 2 | 3 | 351.77 |
| 3 | 5 | 210.56 |
| 4 | 7 | −152.74 |

Table 1 below summarizes various values in each numerical example.

TABLE 1

| | Numerical Example | | | |
| --- | --- | --- | --- | --- |
| | 1 | 2 | 3 | 4 |
| (1) −0.45 < f1a/f1b < −0.10 | −0.250 | −0.327 | −0.380 | −0.300 |
| (2) −5.50 < f1/f2 < −3.00 | −3.542 | −3.800 | −3.600 | −3.400 |
| (3) 0.60 < f1/ft < 1.10 | 0.847 | 0.958 | 0.833 | 0.868 |
| (4) 0.05 < D1ab/D1 < 0.25 | 0.186 | 0.185 | 0.206 | 0.152 |
| (5) 0.50 < f12/f11 < 1.00 | 0.680 | 0.786 | 0.815 | 0.736 |
| (6) 0.20 < M2/ft < 0.35 | 0.255 | 0.287 | 0.252 | 0.276 |
| (7) 75 < vd1ave < 100 | 82.1 | 86.5 | 82.1 | 82.3 |
| (8) −0.90 < f2/fw < −0.50 | −0.678 | −0.715 | −0.654 | −0.731 |

Image Pickup Apparatus

Figure 9:
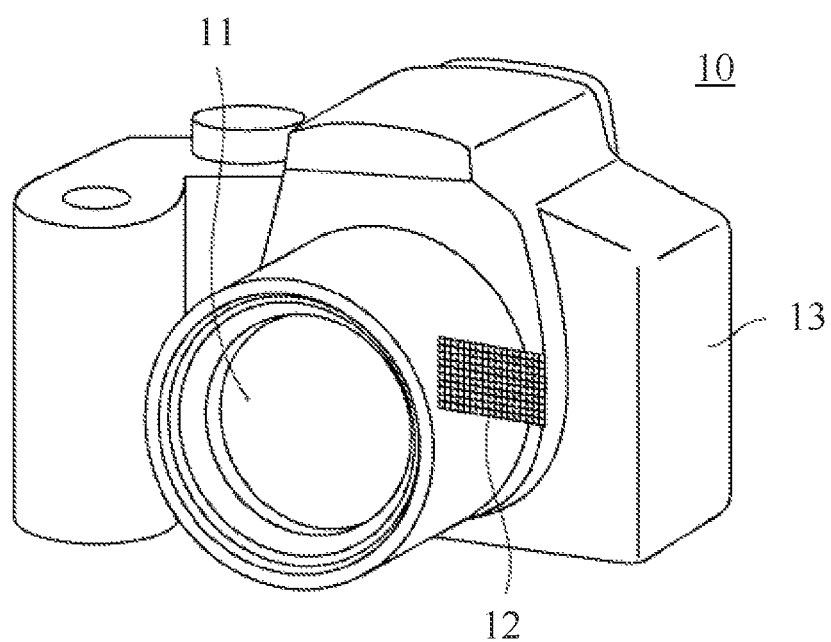
FIG. 9 is a schematic diagram of an image pickup apparatus.

Referring now to FIG. 9, a description will be given of an example of a digital still camera (image pickup apparatus) using the zoom lens according to each example as an imaging optical system. In FIG. 9, reference numeral 10 denotes a camera body, reference numeral 11 denotes an imaging optical system that includes any one of the zoom lenses described in Examples 1 to 4. Reference numeral 12 denotes a solid-state image sensor, such as a CCD sensor or CMOS sensor, built in the camera body 10 and configured to receive and photoelectrically convert an optical image formed by the imaging optical system 11. The camera body 10 may be a so-called single-lens reflex camera with a quick turn mirror, or a so-called mirrorless camera without a quick turn mirror.

Thus applying the zoom lens according to each example to an image pickup apparatus such as a digital still camera, an image pickup apparatus with a small lens can be obtained.

Imaging System

An imaging system (surveillance camera system) may include the zoom lens according to each example and a control unit that controls the zoom lens. In this case, the control unit can control the zoom lens so that each lens unit is moved as described above during zooming, focusing, and image stabilization. At this time, the control unit does not have to be integrated with the zoom lens, and the control unit may be configured as a separate member from the zoom lens. For example, a control unit (control apparatus) remotely located from a driving unit that drives each lens of the zoom lens may include a transmission unit that transmits a control signal (command) for controlling the zoom lens. This control unit can remotely control the zoom lens.

Providing an operation unit such as a controller and buttons for remotely operating the zoom lens to the control unit may control the zoom lens according to an input of the user into the operation unit. For example, the operation unit may include an enlargement button and a reduction button. In this case, the control unit may send a signal to the driving unit of the zoom lens so as to increase the magnification of the zoom lens in a case where the user presses the enlargement button and to decrease the magnification of the zoom lens in a case where the user presses the reduction button.

The imaging system may further include a display unit such as a liquid crystal panel that displays information (moving state) about zoom of the zoom lens. The information about the zoom of the zoom lens is, for example, a zoom magnification (zoom state) and a moving amount (movement state) of each lens unit. In this case, the user can remotely operate the zoom lens through the operation unit while viewing information about the zoom of the zoom lens displayed on the display unit. At this time, the display unit and the operation unit may be integrated by adopting a touch panel or the like.

Each of the above examples can provide a lightweight zoom lens with high optical performance over the entire zoom range, and an image pickup apparatus and an imaging system each having this zoom lens.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-000015, filed on Jan. 1, 2022, which is hereby incorporated by reference herein in its entirety.

What is claimed is:

1. A zoom lens comprising, in order from an object side to an image side, a first lens unit having positive refractive power, a second lens unit having negative refractive power, and a subsequent unit including a plurality of lens units,
  wherein a distance between adjacent lens units changes during zooming, wherein the first lens unit does not move and the second lens unit moves during zooming, wherein the first lens unit consists of, in order from the object side to the image side, a first subunit and a second subunit, wherein the first subunit consists of two positive lenses, wherein the second subunit consists of a single positive lens and a single negative lens, and wherein the following inequalities are satisfied:

$$-0.45 < f1a/f1b < -0.10$$

$$-5.50 < f1/f2 < -3.00$$

$$0.60 < f1/ft < 1.10$$

where f1a is a focal length of the first subunit, f1b is a focal length of the second subunit, f1 is a focal length of the first lens unit, f2 is a focal length of the second lens unit, and ft is a focal length of the zoom lens at a telephoto end.

2. The zoom lens according to claim 1, wherein the following inequality is satisfied:

$$0.05 < D1ab/D1 < 0.25$$

where D1ab is a distance on an optical axis from a lens surface closest to an image plane of the first subunit to a lens surface closest to an object of the second subunit, and D1 is a distance on the optical axis from a lens surface closest to an object of the first lens unit to a lens surface closest to the image plane of the first lens unit.

3. The zoom lens according to claim 1, wherein the following inequality is satisfied:

$$0.50 < f12/f11 < 1.00$$

where f11 is a focal length of the positive lens on the object side in the first subunit, and f12 is a focal length of the positive lens on the image side in the first subunit.

4. The zoom lens according to claim 1, wherein the following inequality is satisfied:

$$0.20 < M2/ft < 0.35$$

where M2 is a moving amount of the second lens unit during zooming from a wide-angle end to a telephoto end where a direction moving toward the image side is set positive.

5. The zoom lens according to claim 1, wherein the following inequality is satisfied:

$$75 < vd1ave < 100$$

where vd1ave is an average of Abbe numbers with respect to d-line of all positive lenses included in the first lens unit.

6. The zoom lens according to claim 1, wherein the following inequality is satisfied:

$$-0.90 < f2/fw < -0.50$$

where fw is a focal length of the zoom lens at a wide-angle end.

7. The zoom lens according to claim 1, wherein the subsequent unit includes, in order from the object side to the image side, a third lens unit having positive refractive power, a fourth lens unit having positive refractive power, a fifth lens unit having negative refractive power, a sixth lens unit having negative refractive power, and a seventh lens unit having positive refractive power.

8. The zoom lens according to claim 1, wherein the subsequent unit includes, in order from the object side to the image side, a third lens unit having positive refractive power, a fourth lens unit having negative refractive power, and a fifth lens unit having positive refractive power.

9. The zoom lens according to claim 1, wherein the subsequent unit includes, in order from the object side to the image side, a third lens unit having positive refractive power, a fourth lens unit having negative refractive power, a fifth lens unit having positive refractive power, a sixth lens unit having negative refractive power, and a seventh lens unit having positive refractive power.

10. The zoom lens according to claim 1, wherein the subsequent unit includes, in order from the object side to the image side, a third lens unit having positive refractive power, a fourth lens unit having negative refractive power, a fifth lens unit having negative refractive power, and a sixth lens unit having positive refractive power.

11. The zoom lens according to claim 1, wherein the second lens unit includes, in order from the object side to the image side, a negative lens, a negative lens, a positive lens, and a negative lens.

12. An image pickup apparatus comprising:

a zoom lens; and an image sensor configured to receive an image formed by the zoom lens, wherein the zoom lens includes, in order from an object side to an image side, a first lens unit having positive refractive power, a second lens unit having negative refractive power, and a subsequent unit including a plurality of lens units, wherein a distance between adjacent lens units changes during zooming, wherein the first lens unit does not move and the second lens unit moves during zooming, wherein the first lens unit consists of, in order from the object side to the image side, a first subunit and a second subunit, wherein the first subunit consists of two positive lenses, wherein the second subunit consists of a single positive lens and a single negative lens, and wherein the following inequalities are satisfied:

$$-0.45 < f1a/f1b < -0.10$$

$$-5.50 < f1/f2 < -3.00$$

$$0.60 < f1/ft < 1.10$$

where f1a is a focal length of the first subunit, f1b is a focal length of the second subunit, f1 is a focal length of the first lens unit, f2 is a focal length of the second lens unit, and ft is a focal length of the zoom lens at a telephoto end.

13. An imaging system comprising:

a zoom lens; and a control unit configured to control the zoom lens during zooming, wherein the zoom lens includes, in order from an object side to an image side, a first lens unit having positive refractive power, a second lens unit having negative refractive power, and a subsequent unit including a plurality of lens units, wherein a distance between adjacent lens units changes during zooming, wherein the first lens unit does not move and the second lens unit moves during zooming, wherein the first lens unit consists of, in order from the object side to the image side, a first subunit and a second subunit, wherein the first subunit consists of two positive lenses,
wherein the second subunit consists of a single positive lens and a single negative lens, and
wherein the following inequalities are satisfied:

$$-0.45 < f1a/f1b < -0.10$$

$$-5.50 < f1/f2 < -3.00$$

$$0.60 < f1/ft < 1.10$$

where f1a is a focal length of the first subunit, f1b is a focal length of the second subunit, f1 is a focal length of the first lens unit, f2 is a focal length of the second lens unit, and ft is a focal length of the zoom lens at a telephoto end.

14. The imaging system according to claim 13, wherein the control unit is configured as a physically separate member from the zoom lens, and includes a transmission unit configured to transmit a control signal for controlling the zoom lens.

15. The imaging system according to claim 13, wherein the control unit is configured as a physically separate member from the zoom lens, and includes an operation unit for operating the zoom lens.

16. The imaging system according to claim 13, comprising a display configured to display information about zoom of the zoom lens.

17. A zoom lens comprising, in order from an object side to an image side, a first lens unit having positive refractive power, a second lens unit having negative refractive power, and a subsequent unit including a plurality of lens units,
wherein a distance between adjacent lens units changes during zooming,
wherein the first lens unit does not move and the second lens unit moves during zooming,
wherein the first lens unit consists of, in order from the object side to the image side, a first subunit and a second subunit,
wherein the first subunit consists of two positive lenses,
wherein the second subunit consists of a single positive lens and a single negative lens, and
wherein the following inequalities are satisfied:

$$-0.45 < f1a/f1b < -0.10$$

$$-5.50 < f1/f2 < -3.00$$

$$0.50 < f12/f11 < 1.00$$

where f1a is a focal length of the first subunit, f1b is a focal length of the second subunit, f1 is a focal length of the first lens unit, f2 is a focal length of the second lens unit, f11 is a focal length of the positive lens on the object side in the first subunit, and f12 is a focal length of the positive lens on the image side in the first subunit.

* * * * *